United States Patent [19]
Han

[11] Patent Number: 5,439,851
[45] Date of Patent: Aug. 8, 1995

[54] PROCESS FOR COATING CERAMIC POWDER WITH ALUMINA BY SOL-GEL PROCESS AND IMPROVED DENSIFICATION

[75] Inventor: Kyoung Ran Han, Seoul, Rep. of Korea

[73] Assignee: Korea Institute of Science and Technology, Rep. of Korea

[21] Appl. No.: 975,654

[22] Filed: Nov. 13, 1992

[30] Foreign Application Priority Data

Dec. 11, 1991 [KR] Rep. of Korea ............... 22700/1991

[51] Int. Cl.$^6$ ........................................ C04B 35/624
[52] U.S. Cl. ..................................... 501/12; 501/127; 252/315.7
[58] Field of Search ................ 501/12, 127; 252/315.7

[56] References Cited

U.S. PATENT DOCUMENTS

| | | | |
|---|---|---|---|
| 3,944,658 | 3/1976 | Yoldas | 423/626 |
| 4,429,051 | 1/1984 | Davidge et al. | 501/12 |
| 4,574,003 | 3/1986 | Gerk | 501/12 |
| 4,788,167 | 11/1988 | Mathers et al. | 501/98 |
| 4,801,399 | 1/1989 | Clark et al. | 501/12 |
| 5,035,724 | 7/1991 | Pukari et al. | 501/12 |

OTHER PUBLICATIONS

Brown "Preparation of Sialons by the Nitrided Pressureless Sintering (NPS) Technique" *Journal of the European Ceramic Society* 6 (1990) 191–200 no month.

Kim et al. "Sintering of $Si_3N_4$ with $Y_2O_3$ and $Al_2O_3$ Added by Coprecipitation" *Journal of the European Ceramic Society* 5 (1989) 311–319 no month.

Kishi et al. "Interaction of Aluminum–Iso–Propoxide Solution and $Si_3N_4$ Powder" *Journal Ceramics Society of Japan* 96 (1988) 687–689 no month.

Jang et al. "Densification of Alumina–Silicon Carbide Powder Composites: 1, Effects of a Polymer Coating on Silicon Carbide Particles" *J. Am. Ceram. Soc.* 72 (6) (1989) 948–953 no month.

Srinivasa Rao et al. "Alumina/Zirconia Composites Produced from Commercial Alumina and Synthesized Hydrous Zirconia" *Ceramics International* 15 (1989) 179–188 no month.

Cortesi et al. "Continuous Coating of Alumina Particles with Alkoxide-derived Zirconia Particles" *Ceramics International* 15 (1989) 173–177 no month.

Olagnon et al. "The Effect of Slip Casting Parameters on the Sintering and Final Properties of $Si_3N_4$" *Br. Ceram. Trans. J.* 88 (1989) 75–78 no month.

Kubo et al. "Sintering Behavior of Ultra–Fine Alumina–Coated Silicon Carbide" Horizons of Powder Metallurgy: Proceedings of the 1986 International Powder Metallurgy Conference & Exhibition The Future of Powder Metallurgy P/M pp. 1151–1154, 1986 no month.

Yoldas, "Alumina gels that form porous transparent $Al_2O_3$", Jour. of Natl. Sci., vol. 10 #11, Nov. 1975.

*Primary Examiner*—Mark L. Bell
*Assistant Examiner*—C. M. Bonner
*Attorney, Agent, or Firm*—Scully, Scott, Murphy & Presser

[57] ABSTRACT

The sol-gel process for forming dense alumina based cermics or dense ceramics with alumina as a sintering additive, the process comprising the steps of: preparing polymeric alumina sol by hydrolysis of Al (O—iBu)3 with a strong acid; preparing the ceramic dispersion in the alumina sol; gelling the dispersion; drying the gel dispersion to form a solid; calcining the solid; and sintering the calcined solid.

4 Claims, No Drawings

PROCESS FOR COATING CERAMIC POWDER WITH ALUMINA BY SOL-GEL PROCESS AND IMPROVED DENSIFICATION

BACKGROUND OF THE INVENTION

1. Field of the Invention

The present invention relates to the production of dense ceramic materials which require alumina as either a densification aid or a matrix, and more particulary to the use of polymeric aluminum containing sols as coating material for ceramic powder as to the means of at least in partial process which resulted in green compacts with better microstructural homogeneity and excellent reproducibility.

2. Description of the Prior Art

Efforts have been focussed on preparing green compacts with microstructural homogeneity. It has been carried out through milling, dispersing, or spray-drying, and followed by forming green compacts by means of dry pressing, slip casting, or colloid pressing. Such prepared green compacts are subjected to densification by hot press, hot isostatic press, pressure or pressureless sintering. Alumina is added in the process of preparing green compacts as a powder or a colliodal sol wherein high purity submicron sized alumina is preferred.

Colloidal alumina sol or gel is disclosed by Yoldas in U.S. Pat. No. 3,944,658 (1976) and thereafter a few methods of preparing peptizable alumina are disclosed. In U.S. Pat. Nos. 4,574,003 (1986) and 4,801,399 (1989) water soluble inorganic salts (e.g. aluminum nitrate or zirconium nitrate) are disclosed as peptizing agents, herein colloidal sol is used for preparing alumina monoliths, alumina-based ceramic abrasive grains, or composites. The ceramic material which results from most, if not all, of these processes is well below its theoretical density.

SUMMARY OF THE INVENTION

According to this invention, the formation of dense alumina based ceramics or dense ceramic materials with an alumina as a sintering additive by a sol-gel process, the process comprising the steps of: preparing polymeric alumina sol by hydrolysis of Al(O—iBu)3 with a strong acid; preparing the ceramic dispersion in the alumina sol; gelling the dispersion; drying the gel dispersion to form a solid; calcining the solid; and sintering the calcined solid; results in a ceramic material with a higher density and a better microstructure than those prepared without the use of the polymeric alumina sol. As a result, the ceramic materials prepared by this invention generally demonstrate greater bending strength, greater hardness and greater fracture toughness.

DETAILED DESCRIPTION OF THE INVENTION

The preparation of alumina-based ceramic materials or ceramics with alumina as a sintering additive from a sol-gel process usually begins with the preparation of a proper alumina sol.

In the present invention the alumina sol is prepared by hydrolysis of aluminum alkoxides in hot strong acidic water in 2-3 hours. Such prepared sol can be concentrated by removing excess liquid with a rotary evaporator. The sol is stable for several weeks at room temperature. The sol can be diluted or concentrated as needed.

If an alumina can be introduced to coat ceramic particles, such prepared powder would sinter at a lower temperature and to a higher density. If a slurry in an alumina sol can be controlled not to segregate or agglomerate prior to gelation of the green body can be assumed to consist of alumina matrix upon calcination, i.e. the particles are coated with alumina. Such prepared alumina sol starts to gel around pH 3.5 and most of nitride, oxide or carbide ceramic powders show higher pH than 3.5 in its aqueous slurry. Therefore the sol slowly begins to gel on the surface of the particle upon mixing. The mixing is usually performed for 10 to 30 minutes with a magnetic stirrer or by a ball milling for about an hour. Gelling of the dispersion may be accelerated by removing solvent slowly. The slurry is then gelled by casting into moulds of the plaster of Paris. The cost materials are dried at room temperature and calcined between 500° and 600° C. The calcined powder was screened through a 200 mesh sieve, and pelletized under 10,000 psi and cold isostatically pressed under between 20,000 and 40,000 psi. The green compact is then sintered by heating with appropriate heating rate to appropriate temperature and soaking at that temperature for 2-3 hours under proper sintering atmosphere.

The following examples are illustrative of certain specific embodiments of the invention; however, these examples are for illustrative purpose only and are not to be construed as limitations of the invention.

EXAMPLES

Example 1

Preparation of TiN/Al2O3/TiAlON composites.

Alumina sol was prepared by the dropwise addition of 23.22 g of Al (O—iBu)3 (95%) to an admixture of 90.0 mL of deionized water and 10.0 mL of formic acid (88%) at 70°–80° C. under refluxing for 3 hours. To this alumina sol, 29 g of AlN and 28 g of TiN was added with vigorous stirring. The mixed slurry was then cast in molds of plaster of Paris. The cast samples were dried at 80° C. in an oven overnight and calcined at 600° C. for 5 hours. Green bodies were prepared by screening to minus 200 mesh, pressing pellets at 10 Kpsi and isostatically pressing them at 40 Kpsi. The green bodies were sintered between 1500° C. and 1800° C. for 2 hours under 5 psi of N2. Composites with different ratios of AlN to TiN ranging from 0.83 to 2.0 were prepared as described above. The effects of the mole ratios of AlN to TiN and alumina added on densification are summarized in Table 1.

TABLE 1

EFFECTS OF MOLE RATIOS OF AlN TO TiN AND ALUMINA ADDED ON DENSIFICATION

| AlN/TiN | Alumina* (wt %) | T (°C.)/t (h) | Density | (g/cm3) |
|---|---|---|---|---|
| 0.83 | 4.1 | 1,600/1.0 | 3.0 | |
| | | 1,600/1.0 | 4.20 | |
| | | 1,680/1.5 | 4.40 | |
| | | 1,680/2.0 | melt | |
| | 7.15 | 1,580/1.5 | 3.65 | |
| | | 1,630/1.5 | 4.17 | |
| | | 1,650/1.5 | 4.15 | |
| 1.0 | 9.2 | 1,600/2.0 | 3.15 | |
| | | 1,630/2.0 | 3.80, | 3.87 |
| | | 1,650/1.0 | 3.88, | 3.84 |
| 1.2 | 8.8 | 1,650/1.0 | 4.16 | |
| | 7.5 | 1,600/2.0 | 3.70 | |
| | | 1,650/1.0 | 3.98 | |
| 1.33 | 3.0 | 1,650/1.5 | 4.17 | |

TABLE 1-continued
EFFECTS OF MOLE RATIOS OF AlN TO TiN AND ALUMINA ADDED ON DENSIFICATION

| AlN/TiN | Alumina* (wt %) | T (°C.)/t (h) | Density | (g/cm3) |
|---|---|---|---|---|
| | | 1,700/0.5 | 4.35 | |
| 1.55 | 3.0 | 1,600/1.0 | 3.61 | |
| | | 1,650/1.0 | 4.29 | |
| | | 1,650/1.5 | 4.31, | 4.38 |
| | | 1,650/2.0 | 4.38 | |
| | | 1,680/2.0 | 4.38 | |
| | 7.0 | 1,500/2.0 | 3.02 | |
| | | 1,500/4.0 | 3.17 | |
| | | 1,500/2.0 | 3.66 | |
| | | 1,630/2.0 | 4.30, | 4.21 |
| | | 1,650/1.5 | 4.33 | |
| | | 1,650/2.0 | 4.41, | 4.36 |
| | | 1,700/2.0 | 4.18 | |
| | | 1,800/2.0 | 3.86 | |
| 11.0 | | 1,650/1.5 | 2.38 | |
| | | 1,680/1.5 | 2.47 | |
| 20.0 | | 1,650/1.0 | 2.39 | |

*Alumina was added as alumina sol.

sintered density was over 99% of the theoretical density.

A silicon nitride was prepared from $Si_3N_4$ (SN-E10, Ube), $Y_2O_3$ (5.0 wt %), AlN (1.49 wt %, Grade B, H.C. Starck) and alumina sol (3.66 wt % as alumina) in the same way as described above to give rise a density greater than 99%. Their XRD showed over 99% of $\beta$-$Si_3N_4$.

Several silicon nitrides were prepared with different amount of additives via the same procedure as described earlier and the results are summarized in the table 2. The densities of commercial $Si_3N_4$ range from 2.7 to 3.3 g/cm³.

TABLE 2
Influence of AlN additions on sintered density of $Si_3N_4$ from different sources.

| SOURCE | Y2O3 (wt %) | Al2O3 (wt %) | AlN (wt %) | SINTERING, T (°C.)/t (hr) | DENSITY, (g/cm3) | MOR (Ksi) | Klc (Mpa · m½) |
|---|---|---|---|---|---|---|---|
| Ube | 5.0 | 5.5 | 0 | 1750/1.0 | 3.04 | | |
| | | | | 1750/2.5 | 3.22 | 122 ± 6 | |
| | 5.0 | 5.5 | 1.5 | 1750/1.0 | 3.18 | | |
| | | | | 1750/2.5 | 3.23 | 122 ± 10 | |
| Ube | 6.0 | 2.0 | 0 | 1750/1.0 | NA | | |
| | | | | 1750/2.5 | 3.22 | 101 ± 3 | 5.89 ± 0.02 |
| | 6.0 | 1.4 | 0.5 | 1750/1.0 | 3.02 | | |
| | | | | 1750/2.5 | 3.24 | 105 ± 0.8 | 6.79 ± 0.08 |
| H. C. Starck | 5.0 | 5.5 | 0 | 1750/2.5 | 3.00 | | |
| | | | | 1780/2.5 | 2.96 | | |
| | 5.1 | 11.5 | 0 | 1750/2.5 | 3.19 | | |
| | | | | 1780/2.5 | 3.25 | | |

Example 3

Preparation of Sialons

Three sialon compositions were prepared as described in example 1. The XRD study showed only $\beta$-$Si_3N_4$ for the 5/1/1 and 5.5/0.5/0.5 systems, and $\beta'$-$Si_3Al_3O_3N_5$ for the 1/1/1 system. Conditions and properties are listed below:

| STARTING MATERIAL (mole ratio) | Y2O3 (wt pct) | SINTERING (°C/h) 5 psi N2 | d(g/cm3) | H(DPN) | MOR | Klc (MPa · √m) |
|---|---|---|---|---|---|---|
| Si3N4/*AlN/Al2O3(1/1/1) | 5.0 | 1,650/2.0 | 3.16 | 1447 | | |
| | | 1,700/0.5 | 3.23 | 1514 | | |
| Si3N4/*AlN/Al2O3(5/1/1) | 5.1 | 1,650/2.0 | 3.16 | 1499 | | |
| | | 1,680/2.0 | 3.24 | 1594 | | |
| Si3N4/*AlN/Al2O3(5.5/0.5/0.5) | 5.0 | 1,700/0.5 | 3.21 | 1622 | | |
| | | 1,750/2.5 | 3.22 | | 99 ± 10 | 5.09 ± 0.37 |

*AlN (H. C. Starck, B grade)

Example 2

Preparation of Sintered Silicon Nitride (5.0 wt % Y2O3, 5.5 wt % Al2O3)

The alumina sol was prepared by hydrolysis of 60.90 g Al (O—iBu)3 (95%, Alfa Products) in an admixture of 270 ml of distilled water and 30 ml of formic acid between 70° and 90° C. To 20 ml of the alumina sol (containing 1.11 g $Al_2O_3$) 18.09 g of silicon nitride (SN-E10, Ube) and 1.01 g yttria (the finest, H. C. Starck) were added with vigorous stirring. The well mixed slurry was poured into molds of the plaster of Paris. The cast samples were dried at 70° C. in an oven overnight and calcined at 650° C. for 3 h. Green compacts were prepared by screening the powder to minus 200 mesh, and pressing pellets at 10 Kpsi and isostatically at 40 Kpsi. The pellets were packed in a mixture of silicon nitride and boron nitride bed. Sintering was conducted under 5 psi of high purity nitrogen atmosphere by heating at a rate of 20° C./min to 1750° C. and holding for 2.5 h. The The densities of commercial sialon range from 3.1 to 3.25 g/cm³, which sintered at temperature of about 1,800° C. before being allowed to cool gradually.

Example 4

Preparation of 15 vol % Zirconia-Alumina Composite

Zirconia toughened alumina composite was prepared by mixing 100 g of alumina (Sumitomo, AKP-30) with 108.6 ml of zirconia sol (Remet Chem. Co, 25 wt % nitrate stabilized), and followed by adding 30 ml of the alumina sol (2.93 g as $Al_2O_3$) as described in example 1. The green compacts were sintered at 1550° for 2h in air to give rise densities greater than 99% of the theoretical density. The bending strength was 95.1±2.1 Ksi and the fracture toughness was 5.15±0.24 MPa·√m. Its x-ray diffraction study showed over 99% tetragonal phase.

Example 5

Preparation of 3 mol pct Y2O3-Zirconia —5.5 wt pct Alumina Composite

Zirconia 27.63, (Aldrich Chemicals, d=5.5 g/cm$^3$) and 1.58 g of yttria (the finest, Herman C. Starck) were thoroughly mixed in 35 ml of the alumina sol (1.70 g as alumina) as prepared in example 1. The green compacts were prepared as described in Example 1. The pellets were sintered under 5 psi of high purity argon atmosphere at 1,400° C. for 2h and 1,500° C. for 2.5h. The densities were 5.14 g/cm$^3$ and 5.74 g/cm$^3$, respectively.

Example 6

Preparation of Alumina-Titanium Nitride Composites

Aluminum nitride (64 mmol, H.C.) and titanium oxide (48 mmol) were thoroughly mixed in 60 ml of the alumina sol (2.0 g alumina) prepared as in example 1. The green compacts were prepared as described in example 1. The pellets were sintered under 5 psi of high purity N2 at 1,650° C. for 1.5 h. The density was 4.245 g/cm$^3$ and its XRD showed only TiN and 00-Al2O3. The powder mixtures were hot pressed at 1,450° C. for one hour at 35 MPa nominal stress in graphite dies. The density was 4.27±0.1 g/cm$^3$ and its fracture toughness at 3.3±0.3 MPa·m$^{\frac{1}{2}}$ measured using a 10 kg indentor.

Example 7

Preparation of TiN/Al2O3/TiAlON—SiC Whisker Composites

Silicon carbide whisker (5.0 g) was added to 31 ml of the alumina sol (4.8 g Al2O3) as prepared in example 1. After 10 min aluminum nitride (17.0) and titanium nitride (21.0 g) were added and vigorously stirred for an additional 20 min. The green compacts were prepared as described in example 1. The pellets were sintered at 1,680° C. for 2 h, and 1,780° C. for 3.0 h. Under nitrogen atmosphere the densities were found 2.51 and 4.46 g/cm$^3$, respectively.

Example 8

Preparation of Alumina-Silicon Carbide Powder Composites

Silicon carbide (5.0 g, H.C. Starck, 3-25 m) was added to 50 ml of alumina sol (5.90 g alumina) as prepared in example 1 and stirred for 15 min, then alumina (39.1 g, Baikowski) was added with vigorous stirring. The slurry was poured into molds of the plaster of Paris. The green compacts were prepared as described in example 1. The pellets were sintered under 5 psi of argon atmosphere at 1,550° and 1,700° C. for 2 h, the densities were 3.49, and 3.51 g/cm$^3$, respectively. The values are comparable to those obtained by Bowen's "disappearing" polymer coating.

Example 9

Preparation of Alumina-silicon Carbide Whisker Composites

Silicon carbide whiskers (2.0 g, American Matrix, 5–60 μm) were dispersed in 17 ml of the alumina sol (2.0 g alumina), and alumina (16.0 g, Baikowski, 2.5 μm) was added and stirred for 20 min. The green compacts were prepared as described in example 1. Sintering was conducted under 5 psi of argon atmosphere at 1,700° C. for 2 h, the density was 3.28 g/cm$^3$.

Although the invention has been described through the preceeding exmples, these examples are for the purpose of illustration only. Variations and modifications can be made without departing from the spirit and scope of the invention as described in the accompanying claims.

What is claimed is:

1. A sol-gel process for forming dense alumina based ceramics or dense ceramics with alumina as a sintering additive, which comprises the steps of:
   preparing a polymeric alumina sol by adding Al-(O—iBu)$_3$ to an admixture of formic acid and water;
   mixing a ceramic powder with said alumina sol to form a dispersion;
   gelling said dispersion;
   drying said dispersion to form a solid;
   calcining the solid;
   grounding or screening the calcined solid;
   shaping said calcined solid into a green body; and
   sintering the green body,
   where drying, calcining and sintering are performed at temperatures effective to dry said dispersion to the solid state, calcine the solid and sinter the calcined solid.

2. The process of claim 1 wherein the gelling of the dispersion is accelerated by removing the solvent slowly.

3. The process of claim 1 wherein the amount of the sol as alumina does not exceed 10 wt % of the solid.

4. The process of claim 1 wherein the forming of a green body can be carried out by dry-pressing, or casting.

* * * * *